Figure 3:
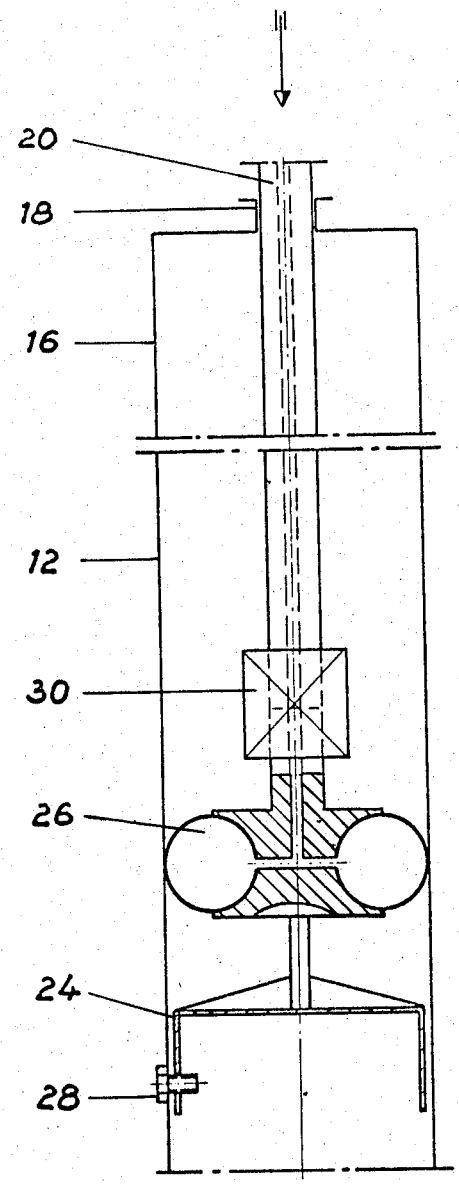

Feb. 20, 1968  L. GRIMM ET AL  3,370,119
HOLLOW ELECTRODE FOR ARC FURNACES
Filed Oct. 26, 1966
2 Sheets-Sheet 1
Fig. 1
Fig. 2
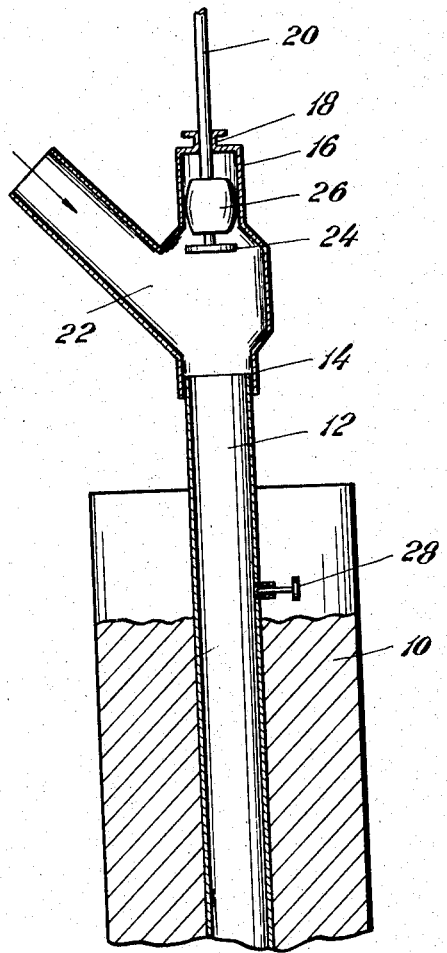
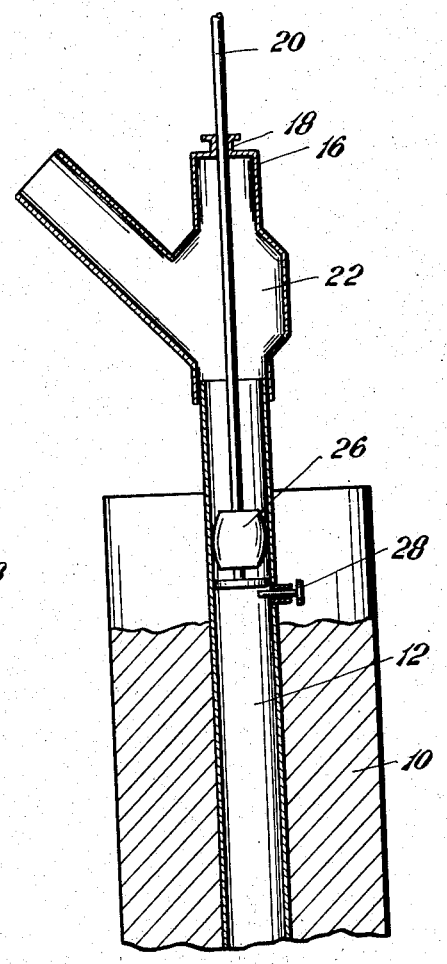

3,370,119
HOLLOW ELECTRODE FOR ARC FURNACES
Ludwig Grimm, Hart (Alz), Franz Kaess, Traunstein, and Otto Kick, Hart (Alz), Germany, assignors to Suddeutsche Kalkstickstoff-Werke Aktiengesellschaft, Trostberg, Upper Bavaria, Germany
Filed Oct. 26, 1966, Ser. No. 589,721
Claims priority, application Germany, Oct. 29, 1965, S 100,273
6 Claims. (Cl. 13—18)

This invention relates to improved hollow electrodes for arc furnaces.

Such hollow electrodes consist of the electrode body proper and an internal tube and have the purpose to allow either charging the furnace through the electrode or to draw off gases developed in the furnace. The advantages of such feed of the charge or gas removal, e.g., in the electrothermic production of calcium carbide, are well known. However, the construction difficulties had not been satisfactorily resolved. A particular difficulty of the charge feed is due to fact that the charge must be introduced against the varying pressures under which the waste gases, essentially carbon monoxide, are blown out from the arc at the lower end of the electrodes.

In operation, the electrodes are continually slipped for about 50 cm. so as to adjust the load. Additionally, they are lowered in certain intervals according to their consumption in the arc. A charging device must be able to follow said movements; this is done by means of a bellow or a telescoping tube which form the longitudinally adjustable connection to the stationary hopper. When the electrodes conventionally used in electric furnaces have lost about 2 m. of their length by said consumption, said length has to be replaced by a corresponding length at the upper end. In order to carry out such replacement, it is necessary to stop the feed of the charge and to close the inner tube of the hollow electrode. Then, the charge head can be removed and the new inner tube and electrode shell can be closed. After the charging device and the charge head has been put into place again, the closure in the inner tube is removed and the feeding of the charge is resumed. Because of the poisonous nature of the escaping carbon monoxide, the inner tube must be always hermetically closed, and the entire operation of extending the electrode must be carried out quickly in view of the high cost of stoppages of the oven operation.

Heretofore, the inner tube was closed by means of gate valves which remain in the electrode and finally pass with the electrode into the melt. Disregarding the economic drawback of losing the closure devices, said devices, in addition, contaminate the melt.

It is, therefore, a principal object of the invention to provide a hollow electrode with simple and economic means for closing the inner tube.

Other objects and advantages will be apparent from a consideration of the specification and claims.

In accordance with the invention, there is provided a tube extension attached to the inner tube by means of a connecting piece which is coaxial with the tube and has the same diameter, which extension is equipped with a plug whose diameter is variable and which is movable from the outside.

The actuating device for displacing, enlarging and shrinking the plub may be a rod or a tube which may pass gas-tight through a stuffing box. When a tube is used, it is possible to pass therethrough a control medium effecting expansion of the plug. It has been found of advantage to protect the plug at the side facing the oven by means of heat resisting shielding against the heat radiation from the oven. The range of displacement of the plug is limited by radially movable studs in the upper section of the inner tube.

Preferred embodiments of the invention, given by way of example, will be hereinafter described with reference to the accompanying drawings in which:

FIG. 1 is a cross-sectional view of an electrode according to the invention in a position allowing admission of a charge, FIG. 2 is a similar view showing the plug of the electrode in closing position, and FIG. 3 is a diagrammatic view of a somewhat different plug construction.

Referring now to the drawing, the electrode body 10 is equipped in conventional manner with the inner tube 12 which carries a top piece 14. Said top piece is provided with a lateral tube 22 for the admission of the charge and, in addition, with a axial tube 16 which is coaxial with the inner tube 12 and has approximately the same diameter as said tube. In said flange 16, a plug 26 of a resilient material like natural or synthetic rubber is displaceably arranged; the diameter of the plug can be varied either by applying pressure from the outside by means by an actuating rod 20, or by a spindle, which, by pressure application, enlarges the diameter of the plug 26. The actuating rod 20 may be formed also as a tube in order to supply a fluid, for instance nitrogen, under pressure to expand a hollow plug 26 (FIG. 3). A radially movable stop bolt 28 is provided at the inner tube 12 to limit the down movement of the plug means 26, preferably, the stop 28 engages heat shield means 24 secured to the underside of the plug to protect the same against excessive heat radiation from the oven.

After the feed of the charge has been stopped, the plug 26 is moved from the position shown in FIG. 1 to that of FIG. 2. When the downward movement of the rod 20 is stopped, e.g., by engagement of the heat-shield means 24 with the stop means 28, the plug 26 will be expanded either by further mechanical pressure or pneumatically by means of the rod or tube 20, and close the inner tube 12. Subsequently, the admission tube of the top piece 14 can be removed together with the actuating rod 20, without risking the escape of gas. To facilitate removal, the rod 20 can be connected to the plug 26 by means which are releasable from the outside, e.g., by a turn or bayonet joint 30 (FIG. 3).

We claim:
1. A hollow electrode for arc furnaces comprising a shell of electrode material forming the electrode body, an inner tube inside said body, an admission tube opening into said inner tube, a branch of said admission tube of approximately the same diameter as said inner tube extending said inner tube upwardly coaxially therewith, expansible closure plug means vertically movable in said branch tube and inlet tube, and means actuated from the outside for displacing said plug means.

2. A hollow electrode as claimed in claim 1 wherein said actuating means is a rod releasably joined to said plug means.

3. A hollow electrode as claimed in claim 2 comprising a stuffing box inside said branch tube providing for a gas-tight passage of said actuating means.

4. A hollow electrode as claimed in claim 1 wherein said plug actuating means is a pipe.

5. A hollow electrode as claimed in claim 1 comprising a heat-resistant plate arranged below said plug means.

6. A hollow electrode as claimed in claim 1 comprising in said inner tube radially displaceable stop means to limit the downward movement of said plug means.

References Cited

UNITED STATES PATENTS

| 430,453 | 6/1890 | Willson | 75—10 |
| 1,640,735 | 8/1927 | Soderberg | 13—18 |

BERNARD A. GILHEANY, *Primary Examiner.*

H. B. GILSON, *Assistant Examiner.*